Figure 1:
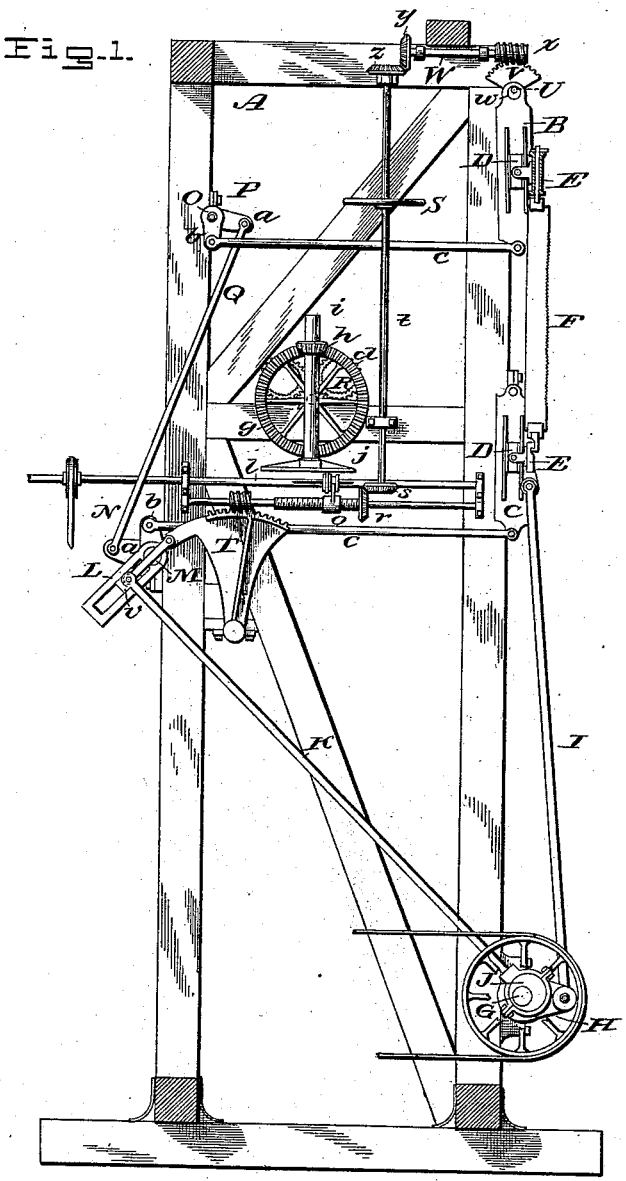

(No Model.) 2 Sheets—Sheet 1.

G. M. HINKLEY.
DEVICE FOR OSCILLATING THE GUIDES OF RECIPROCATING SAW MILLS.
No. 273,361. Patented Mar. 6, 1883.

WITNESSES:
Jas. F. Duhamel.
Walter S. Dodge.

INVENTOR.
George M. Hinkley,
by Dodge & Son,
Attys.

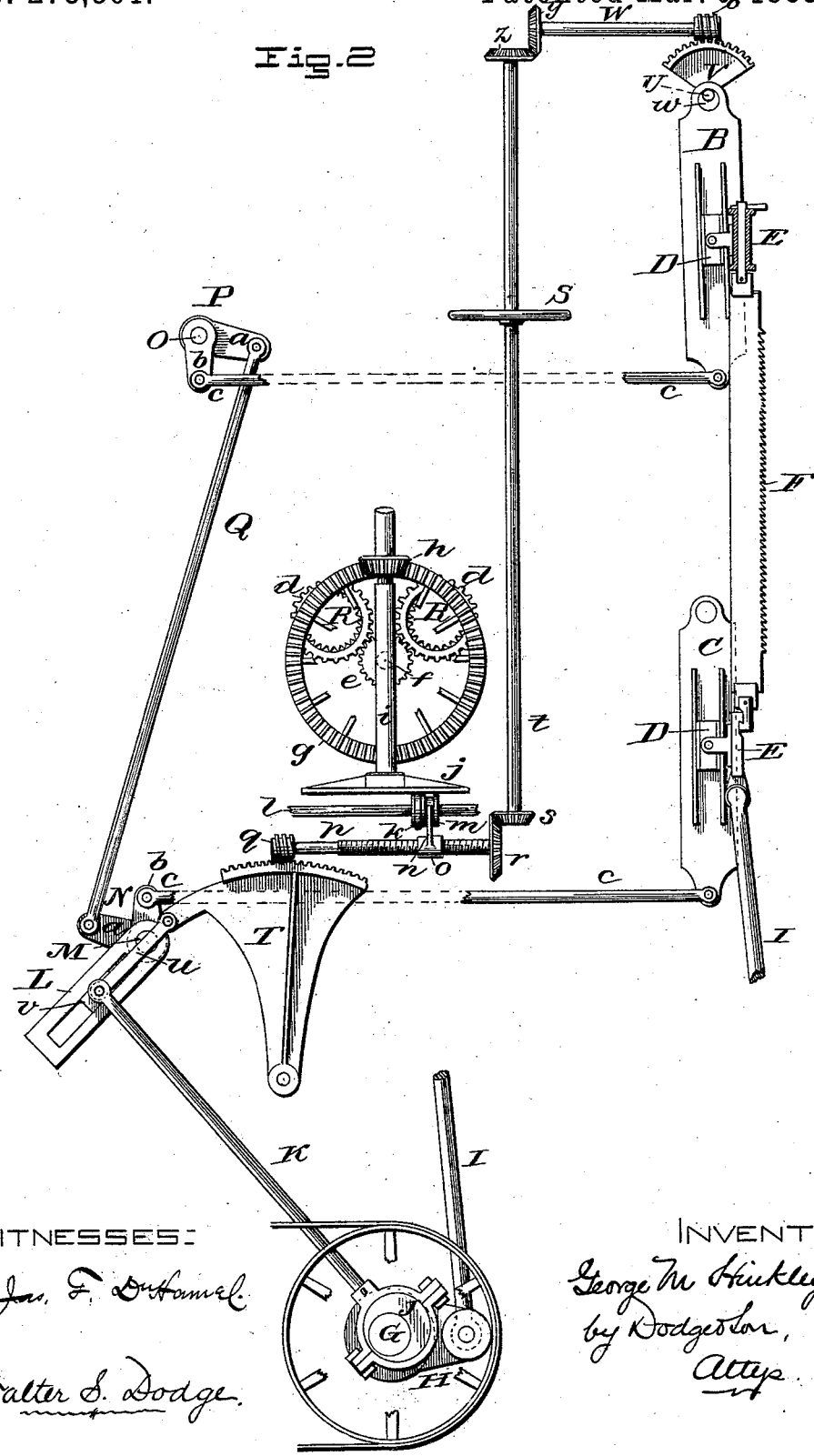

UNITED STATES PATENT OFFICE.

GEORGE M. HINKLEY, OF MILWAUKEE, WISCONSIN.

DEVICE FOR OSCILLATING THE GUIDES OF RECIPROCATING SAW MILLS.

SPECIFICATION forming part of Letters Patent No. 273,361, dated March 6, 1883.

Application filed December 11, 1882. (No model.)

*To all whom it may concern:*

Be it known that I, GEORGE M. HINKLEY, of Milwaukee, in the county of Milwaukee and State of Wisconsin, have invented certain Improvements in Gang-Saw Mills, of which the following is a specification.

My invention relates to saw-mills; and it consists in a novel construction and arrangement of mechanism, whereby a variation of the feed is caused to produce simultaneously a variation in the rake and oscillation of the saw-gang.

It further consists in various features and sub-combinations, whereby certain of the results above stated may be independently accomplished when it is not desirable to effect all of them simultaneously.

In the accompanying drawings, Figure 1 represents a side elevation of my improved mechanism; Fig. 2, an enlarged view of the same, parts being broken away to permit the mechanism to be shown of proper size within the limits prescribed.

Hitherto mechanism has been devised by which an oscillating movement is imparted to one of the guides of the "saw gate" or frame at each side of the latter, and other mechanism has been designed by which both the upper and the lower guides are oscillated simultaneously in the same or in opposite directions, the object of both arrangements being to cause the saws to advance on the cutting-stroke and to recede on the return-stroke to and from the bottom of the kerf.

This invention is designed to render the adjustment of the oscillating mechanism capable of simultaneous and proportionate regulation or change with that of the feed mechanism, and to enable both to be effected by one and the same operation, to cause both the upper and the lower guide to oscillate or move in the same direction simultaneously, to provide for a change in the rake of the saws and to cause said change of rake to be produced simultaneously with a change of feed, and, finally, to cause the change of feed, the variation of the rake, and the change of oscillation to be produced simultaneously, proportionately, and by one operation.

With these objects in view I construct and arrange the mechanism as shown in the accompanying drawings, in which A represents the frame-work of the machinery, at each side of which are hung or pivoted an upper and a lower guide, B and C, which serve to carry and guide the pivoted blocks D upon the ends of the cross-heads E of the saw gate or frame F. These guides are suspended or hung from pivots at their upper ends, about which they swing or oscillate for the purpose of causing the saws to advance and recede, as presently explained.

G represents the driving-shaft, provided with a crank, H, which is connected with the saw gate or frame F by a pitman, I, and serves to raise and lower the same, as usual. It is also furnished with an eccentric, J, which is connected by a pitman, K, with an arm, L, rigidly secured to a rock-shaft, M, which latter carries an elbow-lever, N.

O represents a second rock-shaft, also provided with an elbow-lever, P, which is the counterpart of the lever N, and may be set in the same position upon its rock-shaft, or may be turned relatively upside down, as shown in the drawings, the corresponding arms, *a*, of the two levers being in either case connected with each other by a rod or pitman, Q, so that their remaining arms *b* shall move simultaneously, equally, and in the same direction relatively to the saws carried by the gate or frame F. The arms *b* of elbow-levers N and P are connected respectively with the lower ends of the swinging or oscillating guides B and C, so that upon the rocking of the shafts M and O the guides are caused to oscillate alike.

The parts being thus constructed and arranged, it follows that upon the rotation of the driving-shaft G the saw gate or frame F is drawn down, and, motion being given to arm L through the medium of pitman K and eccentric J, the elbow-levers N and P, acting upon the guides B C through the connecting-rods *c*, swing the lower ends of the guides forward, causing the saws to advance as they pass down through the log, and then the frame or gate rises, the arm L is moved in the reverse direction, and the guides swing back away from the gate or frame, causing the saws to recede from the bottom of the kerf. It will be observed that under this arrangement of the guides and their oscillating mechanism the movements of the saws are regular and alike throughout instead of changing in direction at different points in the stroke, and this feature is one of great importance, giving a very perfect cut and less strain and racking of the machinery than under the other plan.

I will now explain how the oscillation of the guides is controlled simultaneously and in unison with the feed.

R R represent the feed-rolls, upon which the log or lumber rests and by which it is advanced toward the saw, it being of course understood that any required number of such rolls will be employed, and that some of them will in practice be located in front and others in rear of the saws, as usual. The rollers R R are furnished with pinions or gear-wheels $d$, which mesh with and are driven by a pinion, $e$, fast upon a shaft, $f$, which also carries a bevel gear wheel, $g$, which is rotated by a bevel-pinion, $h$, fast upon a vertical shaft, $i$, carrying a friction plate or disk, $j$, upon its lower end. Motion is imparted to the disk $j$ by a friction wheel or roller, $k$, mounted and free to slide longitudinally upon a splined shaft, $l$, which is the feed-shaft proper of the mill. The spline of shaft $l$ prevents the roller $k$ from turning except with the shaft, which latter passes diametrically across beneath the friction-plate. As the roller $k$ is moved along its shaft nearer to the center of the disk $j$ the speed of the latter, and consequently the speed of the feed-rollers, is increased, while the movement of the friction-roller $k$ from the center of the disk produces an opposite effect. For the purpose of thus adjusting the friction-roller $k$ there is formed upon it a hub or neck, $m$, which is grooved to receive a yoke or arm, $n$, the hub or boss $o$ of which is threaded interiorly to fit upon a threaded shaft, $p$, which is furnished at one end with a worm, $q$, and at the opposite end with a bevel-pinion, $r$, which pinion meshes with a similar bevel-pinion, $s$, secured upon a shaft, $t$, carrying a hand-wheel, S. By turning the hand-wheel the screw-shaft $p$ is caused to rotate, which in turn causes the yoke $n$ to travel upon said shaft and to move the friction-roller $k$ toward or away from the center of disk $j$, according to the direction of rotation of the hand-wheel, thereby increasing or diminishing the rate of feed, as will be readily understood.

T represents a pivoted or swinging toothed segmental rack, with the teeth of which the worm $q$ of screw-shaft $p$, above referred to, engages, so that as said shaft is rotated to increase or diminish the rate of feed the segment T is rocked or tipped upon its pivot in one or the other direction. The segment T is connected by a link, $u$, with a block, $v$, sliding in or upon the arm L of rock-shaft M, by which, as already explained, motion is given, through intervening mechanism, to the guides B C, and to this block is also attached the end of pitman K, by which arm L is moved. It will be observed that when the segment is rocked or tipped toward the rock-shaft M the block $v$ will be moved outward in or upon arm L, away from the center, where the throw of eccentric J will have least effect upon the arm, and will move it a shorter distance than when the block is drawn inward toward rock-shaft M. It will also be noted that just as the rate of feed is increased the movement of arm L is increased, and vice versa, and as the oscillation of the guides B C is of course increased or diminished in harmony with the increase or diminution of the throw of arm L, it follows that an increase of feed will increase the oscillation of the guides and a decrease of feed will decrease the oscillation of the guides.

In the drawings I have represented the arm L as slotted and the block $v$ as mounted in the slot; but it is obvious that the arm may pass through the block, if preferred.

It is sometimes desirable to vary the rake or inclination of the saws, and to accomplish this purpose I suspend the upper guide, B, at each side from an adjustable pivot. The pivot may be provided with a neck or shank passing through a slot in the supporting-frame, and adapted to be adjusted and clamped at any desired point in the slot, or may be carried by a block adjustable by means of screws, wedges, or equivalent means; but I prefer to employ an eccentric pivot, $w$, for each, as being the simplest and most efficient means of adjusting the guides to vary the rake of the saws. In practice the eccentrics $w$—one for each guide B—will be secured upon a cross-shaft, U, the rotation of which will insure a like adjustment of both eccentrics. This adjusting device might in some cases be used without being directly connected with the feed mechanism, (as it will ordinarily be, however,) and when so used may be conveniently adjusted by means of a worm, $x$, engaging with a toothed segment, V, secured upon the shaft U, the shaft W, which carries the worm $x$, being in such case furnished with a hand-wheel. Ordinarily, however, I prefer to so connect the rake-adjusting pivots with the feed-regulating shaft in order that the regulation of both may be effected simultaneously in proper relative degree, to accomplish which it is only necessary to provide shaft W with a bevel-pinion, $y$, to mesh with a similar pinion, $z$, on the shaft $t$, which carries the feed-regulating hand-wheel. Thus it will be seen that by simply turning the hand-wheel S the feed is regulated, the oscillation of the saw-guides and saws is varied, and the rake of the saws is changed and each in a fixed degree relatively to the others.

It will of course be understood that there is an upper and lower guide, B C, at both sides of the saw gate or frame F, and that in other details and particulars not specially illustrated or described, because not a part of or essential to a clear understanding of this invention, will be of usual construction and arrangement.

It will also be seen that the precise construction of the feed mechanism is not essential, but that the improvements herein set forth can be readily adapted by a mechanic of ordinary skill to any common style of feed mechanism. The feed-shaft will receive motion from the main driving-shaft through the medium of a belt, gearing, or other suitable connection—as, for instance, pawl-and-ratchet mechanism.

It is obvious that the upper pivot of the swinging guides may be made stationary, and a varying rake produced by employing the eccentric pivot at the lower end of the guide, or at either end of the connecting-rods $c$, and that the guides could be pivoted at their lower ends, the operating mechanism being set accordingly, though the suspension from above is considered the better plan.

I am aware that devices for oscillating guides at one end only of the saw-frame or gate have been heretofore employed and connected with feed-regulating mechanism, and that it is not broadly new to adjust saw-frame guides to vary the rake of the saws. Hence I do not broadly claim such features; but I am not aware that both the upper and lower guides have been thus connected with feed-regulating mechanism, or that a swinging saw-guide has ever before been made adjustable as to rake.

Having thus described my invention, what I claim is—

1. In combination with the feed mechanism and the driving-shaft of a saw-mill gang, upper and lower guides carrying the saw gate or frame, and mechanism, substantially such as shown, for oscillating both the upper and lower guides, connected with and driven by the main driving-shaft, and also connected with the feed mechanism by intermediate connections, substantially as shown, whereby a change of feed is caused to produce a corresponding change in the oscillation of the upper and lower guides.

2. The combination, in a saw-mill, of a variable-feed mechanism, a guide-oscillating mechanism, and intermediate connections, said parts being constructed and arranged to operate substantially as shown and described, whereby the variation of the feed is caused to produce a like variation in the oscillation of both the upper and lower guides.

3. In a saw-mill, the combination of feed-rolls, variable gear for imparting motion to said rolls, upper and lower saw-gate guides, variable mechanism for oscillating said guides, and a regulating-shaft common to both the feed-gear and the oscillating mechanism, and adapted to vary the action of both simultaneously, substantially as explained.

4. In combination with feed mechanism substantially such as shown, friction-disk $j$, feed-shaft $l$, and friction-roller $k$, arranged to move longitudinally upon said shaft, and with guides B C, elbow-levers N P, connected with each other and with the guides, arm L, mounted upon rock-shaft M, with elbow-lever N, block $v$, arranged to move lengthwise of said arm, and connected with swinging segment T and eccentric J, screw-shaft $p$, provided with worm $q$ and carrying yoke $n$, the latter serving to move friction-roll $k$, and the hand-wheel shaft $t$, connected with screw-shaft $p$, substantially as shown and described.

5. In a saw-mill, a swinging saw-guide having its end sustained by an adjustable pivot adapted to remain fixed while the saw is in operation, whereby the rake of the saw may be varied.

6. In a saw-mill substantially such as described, the combination of guides B and rotatable eccentric pivots $w$, as and for the purpose set forth.

7. In combination with guides B, cross-shaft U, provided with eccentrics $w$, seated in holes or bearings in the upper ends of the guides, whereby the rotation of the shaft is caused to vary the pivotal point of the guides.

8. In combination with guides B, cross-shaft U, provided with eccentrics $w$ and toothed segment V, and shaft W, provided with worm $x$, all substantially as shown.

9. In combination with the feed mechanism of a saw-mill and with a swinging saw-guide having an adjustable pivot and arranged to guide the saw-frame in its rise and fall, a feed-regulating shaft connected with the feed mechanism and with the adjustable guide pivot, substantially as shown and described, whereby the movement of said regulating-shaft is caused to simultaneously vary the feed and the rake of the saw.

10. In combination with feed mechanism substantially such as shown, provided with friction-disk $j$, feed-shaft $l$, carrying friction-roll $k$, screw-shaft $p$, carrying yoke $n$, and with eccentric guide pivot $w$, toothed segment V, and shaft W, provided with worm $x$, the hand-wheel shaft $t$, adapted and arranged to impart rotation to the screw-shaft $p$ and worm-shaft W simultaneously, as explained.

11. In a saw-mill, the combination of a variable-feed and feed-regulating mechanism, a guide-oscillating mechanism, and an adjustable guide pivot, said oscillating mechanism and adjustable pivot being connected with the feed-regulating mechanism by intermediate connecting devices substantially such as described and shown, whereby a variation of the feed is caused to produce a simultaneous and corresponding variation of the oscillation of the guide and of the position of the pivot, with a consequent variation in the rake of the saw.

12. In a saw-mill the combination of feed mechanism substantially such as shown, provided with friction-disk $j$, feed-shaft $l$, carrying sliding friction-roll $k$, screw-shaft $p$, carrying yoke $n$ and worm $q$, the swinging segment T, block $v$, connected with the segment and with eccentric J of driving-shaft G, the arm L, elbow-levers N P, pitmen c c and Q, and guides B C, eccentric pivot w, segment V, shaft W, provided with worm x, and the hand-wheel shaft t, connected with screw-shaft p and worm-shaft W by bevel-gears or their equivalents, all substantially as shown and described, whereby the rotation of the hand-wheel is caused to simultaneously vary the feed of the lumber and the oscillation and rake of the saw.

GEORGE M. HINKLEY.

Witnesses:
 WM. W. ALLIS,
 ALBERT HOPPIN.